United States Patent
Van Egdom et al.

[15] 3,655,055
[45] Apr. 11, 1972

[54] BAND FILTER PRESS

[72] Inventors: Richard Van Egdom, Bahnhofstrasse 45, 5164 Noervenich; Alfons Schotten, Rurstrasse 13, 516 Dueren, both of Germany

[22] Filed: July 2, 1970

[21] Appl. No.: 52,045

[30] Foreign Application Priority Data

Dec. 9, 1969  Germany ..................... P 19 61 608.1

[52] U.S. Cl. .............................................. 210/225
[51] Int. Cl. ............................................. B01d 33/00
[58] Field of Search ..................... 100/198; 210/224, 225

[56] References Cited

UNITED STATES PATENTS 3,486,624  12/1969  Sykes ..................................... 210/225

FOREIGN PATENTS OR APPLICATIONS 1,080,461  8/1967  Great Britain ......................... 100/198

Primary Examiner—Reuben Friedman
Assistant Examiner—T. A. Granger
Attorney—Michael S. Striker

[57] ABSTRACT

A cleaning arrangement comprising several fan spray nozzles and scrapers for cleaning both surfaces, and the entire width, of the filter band, in a vertical filter press, between the outlet end of the band from the filter plates and the drive roller for the band.

11 Claims, 2 Drawing Figures

PATENTED APR 11 1972 3,655,055

INVENTORS
Richard Van Egdom

BY

BAND FILTER PRESS

BACKGROUND OF THE INVENTION

The invention relates to a cleaning arrangement, in a band filter press, for cleaning the filter band.

In vertical filter presses, having a number of filter plates arranged one over the other, the cloth filter, which is in the form of an endless band, or belt, is pulled zigzag along the path defined by the filter plates by a drive roller that is located after the last filter plate. This known arrangement has the disadvantage that the filtration residue, which clings to, or is held in, the cloth band, is pressed into the band by the pressure roller, which is held against the drive roller. As a consequence, it is more difficult to clean the band after the drive roller with a spray arrangement. Moreover, the pull of the drive roller on the band is adversely affected and can even be completely prevented. It is useless to roughen or profile the surface of the drive and/or pressure roller, because filtration residue quickly fills up the depressions in the roller surface.

SUMMARY OF THE INVENTION

An object of the invention is a cleaning arrangement in a filter press located between the outlet end for the band, at the last filter plate, and the drive roller.

Another object of the invention is a cleaning arrangement of this kind having mechanical means, such as one or more scrapers and/or stationary or rotating brushes, and/or spray means.

The invention broadly comprises in a filter press an elongated, such as an endless, filter band of fluid permeable material and a plurality of relatively movable filter elements that define for the filter band a path having an outlet end, and drive means spaced from the outlet end and arranged to move the band along a path, whereby it collects contaminates, and an arrangement for cleaning the filter band between the outlet end and the drive means so that at least some of the contaminates are removed from the band ahead of the drive means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
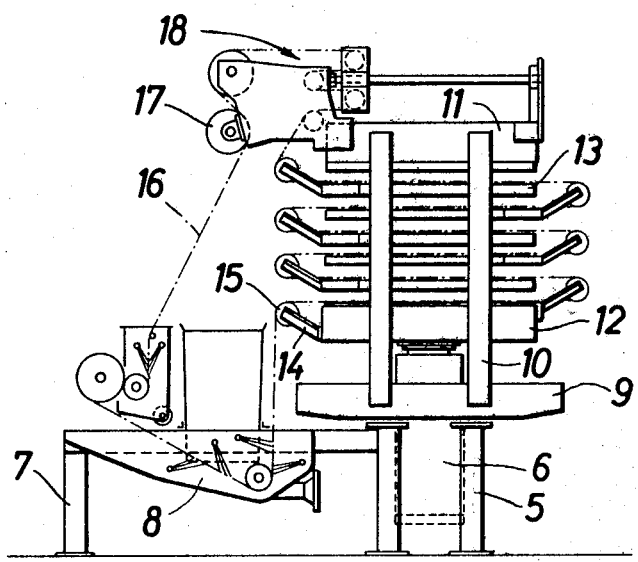
FIG. 1 shows a vertical filter press equipped with the cleaning arrangement of the invention shown in side view.

With reference to FIG. 1, the band filter press comprises a frame having columns 5, between which a lifting cylinder 6 is arranged. A frame part 7 carries a washing tank 8. The columns 5 support a base plate having a collecting tube 9 for the filtrate, and the four columns 10 (only two being visible) support a press head 11. A series of filter plates 13 —five, for example— are arranged between the columns 10 and the lifting table 12, which is connected to the upper end of the lifting cylinder 6. The filter plates are shown in the open position of the press, the lifting cylinder 6 being in its lower position. The frames of the filter plates are provided with arms 14, which at their ends rotatably support guide rollers 15. An endless filter band 16 is guided zigzag between the filter plates, is let to the wash tank 8, passes over a regulating roller 17, which is adjusted to keep the band straight, and finally passes through a tensioning roller arrangement 18 before it is returned to the press proper.

Figure 2:
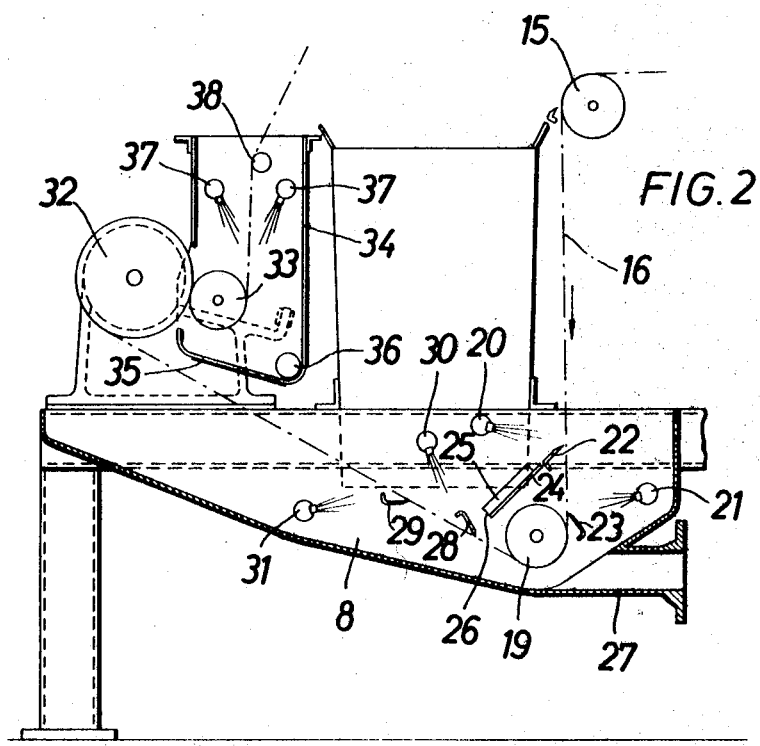
FIG. 2 is a side view in cross section of the cleaning arrangement.

As seen in FIG. 2, the band 16 moves in the direction of the arrow from the last guide roller 15 into the wash tank 8, which has a lower guide roller 19 beneath the last roller 15, which constitutes for the band the outlet end of the press. Before the filter band passes under the roller 19 two fan spray nozzles 20 and 21 clean the band. The two sprays overlap at the band so that the entire width of the band is sprayed with a cleaning medium, which can be filtrate from the filtering operation. As a consequence, the filter band is thoroughly prewashed, whereby the filtration residue after having passed by the spray nozzles 20 and 21 is removed by scrapers 22 and 23. In order to prevent the residue from falling back onto the filter band, the scraper 22 has a plate 24 with gutter-like deflectors 25 that diverge towards the bottom of the plate 24, so that the scraped residue sliding down the deflectors is discharged at the deflector ends 26 outside of the width of the band. The scraper 23 does not require this arrangement, because the scraped residue falls directly into the wash tank 8 and can be carried off through the short discharge pipe 27.

After the filter band leaves the roller 19, scrapers 28 and 29 respectively clean the upper and lower band surfaces, and two additional fan spray nozzles 30 and 31 spray the band surfaces, in order to remove the last of the residue. The band then winds around approximately three-quarters of the circumference of a drive roller 32, the drive of which is not shown. A pressure roller 33, pushed by a spring, is adjustably squeezed against the drive roller 32. for part If the filtration residue is washed with filtrate in the wash tank 8, because the solid matter is recovered, then it is advisable to rewash the filter band with water in a rewash tank 34 containing the pressure roller 33. The bottom of this tank is inclined and has a discharge opening 36. Two fan spray nozzles 37 spray water on respective sides of the band. The cleaned band then moves over a guide roller 38 to the regulating roller 17.

The rewash tank 34 and the fan sprays 37, although not an essential part of the invention, are advantageous when the band 16, for reasons of economy, is cleaned with filtrate, if the filtration residue is collected. The washing medium in the rewash tank 37 can, in this case, be water. Alternatively, water can be supplied to two oppositely disposed spray nozzles associated with the wash tank 8, should filtrate be used fopart of the washing.

In accordance with the invention, one, more, or all of the scrapers can be replaced by stationary or rotating brushes that are positioned immediately in front of, or after, the associated fan spray nozzles.

The cleaning arrangement of the invention can comprise only spray nozzles or only mechanical means, such as scrapers or brushes, or any desired combination of these, in dependence on the kind of cleaning action required.

The fan spray nozzles have proved to be particularly advantageous, because the previously used pipes with spray openings only sprayed the cloth filter along incremental areas that extended in the direction of band movement and were separated by a distance corresponding to the separation between adjacent spray openings in the pipe. Consequently, there were regularly spaced incremental areas of the band that were not sprayed.

The press operates in the following manner. Liquid to be filtered is supplied to the space between the filter band add the next upper filter plate 13, whereupon the press is closed, and the filtrate squeezed through the cloth band 16 is collected.

It will be understood that each of the elements described above, or two or more together, may also find a useful application in other types of band filter press differing from the type described above.

Without further analysis, the foregoing will so fully revel the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In a band filter press, a filter arrangement having an inlet and an outlet for an endless filter band; an endless filter band of fluid-permeable material; guide means for guiding said endless filter band along a filtering path from said inlet through said filter arrangement and out through said outlet and then along a return path back from said outlet to said inlet of said filter arrangement; drive means arranged along said return path spaced from said outlet and engaging said filtering band to move the same along said return path from said outlet back to said inlet; and cleaning means including a washing arrangement located along said return path between said outlet and said drive means and serving for cleaning said endless filter band so that said band is washed and cleaned before being engaged by said drive means.

2. An arrangement as defined in claim 1, said washing arrangement including means for conveying a stream of washing medium through said band across the entire width thereof.

3. An arrangement as defined in claim 1, said washing arrangement including at least one mechanical cleaning means for cleaning the entire width of the band.

4. An arrangement as defined in claim 3, wherein said mechanical cleaning means are at least one brush.

5. An arrangement as defined in claim 4, wherein said brush rotates so as to increase the cleaning action.

6. An arrangement as defined in claim 3, wherein said mechanical cleaning means are at least one scraper.

7. An arrangement as defined in claim 6 further comprising means associated with said scraper for preventing sraped-off contaminates from falling back onto the band.

8. An arrangement as defined in claim 2, said washing arrangement including at least one means for producing a fan spray of washing medium that covers the entire width of the band.

9. An arrangement as defined in claim 8, said washing arrangement including at least one mechanical cleaning means for cleaning the entire width of the band.

10. An arrangement as defined in claim 9, wherein said path has an inlet end and further comprising rewash means located between said inlet end and said drive means for rewashing the band already at least partly cleaned by said washing arrangement.

11. Cleaning apparatus for cleaning the continuous filter band of a band filter press comprising, in combination, (a) a band filter press with a continuous filter band and a wash tank; (b) first spray and scraper means constructed and arranged to clean said continuous filter band after use for filtration in said filter press and before engagement with a first guide roller for said filter band within said wash tank; and (c) second spray and scraper means within said wash tank constructed and arranged to clean said continuous filter band after engagement with said first guide roller and before engagement with a drive roller for said continuous filter band, whereby said continuous filter band is essentially cleaned of residue before engagement with said drive roller.

* * * * *